United States Patent [19]

Sugiura et al.

[11] Patent Number: 4,491,827

[45] Date of Patent: Jan. 1, 1985

[54] PRESET COUNTER APPARATUS FOR COPYING MACHINES AND THE LIKE

[75] Inventors: Masamichi Sugiura; Tsuneo Kitagawa, both of Aichi, Japan

[73] Assignee: Minolta Camera Kabushiki Kaisha, Osaka, Japan

[21] Appl. No.: 327,255

[22] Filed: Dec. 3, 1981

[30] Foreign Application Priority Data

| | | | |
|---|---|---|---|
| May 12, 1980 | [JP] | Japan | 55-172223 |
| May 12, 1980 | [JP] | Japan | 55-172224 |
| May 12, 1980 | [JP] | Japan | 55-172225 |
| May 12, 1980 | [JP] | Japan | 55-172226 |
| Mar. 10, 1981 | [JP] | Japan | 56-34947 |

[51] Int. Cl.[3] .......... G06F 3/02; G03G 15/00

[52] U.S. Cl. .......... 340/365 R; 340/365 E; 340/711; 355/14 CU

[58] Field of Search .......... 340/700, 365 R, 789, 340/711, 815.13, 365 E; 364/518; 355/133, 14 R, 14 CU; 235/144 E, 82 SK, 82 FK, 82 R, 91 C

[56] References Cited

U.S. PATENT DOCUMENTS

| | | | |
|---|---|---|---|
| 2,527,661 | 10/1950 | Stack | 235/144 E |
| 3,022,942 | 2/1962 | Van Veen | 235/82 R |
| 4,086,588 | 4/1978 | Kawanabe et al. | 340/365 E |
| 4,158,759 | 6/1979 | Mason | 340/365 R |
| 4,206,458 | 6/1980 | Sado | 340/789 |
| 4,258,426 | 3/1981 | Balzarini et al. | 340/365 R |
| 4,369,440 | 1/1983 | Piguet et al. | 340/365 R |
| 4,393,375 | 7/1983 | Sugiura et al. | 340/700 |

FOREIGN PATENT DOCUMENTS 54-145545 8/1978 Japan .

*Primary Examiner*—James J. Groody
*Attorney, Agent, or Firm*—Jackson, Jones & Price

[57] ABSTRACT

The present invention provides a preset counter apparatus for a copying machine wherein input keys are capable of independently controlling the numerical value of the number of copies to be made and displayed. Thus, an operator can activate one key to change the digit positions of units and another key to change the digit position of tens. The control of the number of copies to be made is specifically designed to facilitate operator use and to avoid operator errors. Simultaneous activation of more than one key prevents any change in any values in both the units and tens positions.

4 Claims, 14 Drawing Figures

PRESET COUNTER APPARATUS FOR COPYING MACHINES AND THE LIKE

BACKGROUND OF THE INVENTION

1. Field of the Invention

The present invention relates to a preset counter apparatus for use, for example, in copying machines for setting and displaying the number of copies to be made in a continuous mode of operation.

2. Description of the Prior Art

Preset counters heretofore generally used in copying machines for setting the number of copies to be made continuously are frequently those of a mechanical rotary type comprising, for example, a setting dial and a ratchet wheel in combination. The dial is rotated by one division of its scale for every copying cycle and adapted to turn off a switch for continuing the copying operation when rotated to its final position. However, mechanical counter apparatus of this type generally requires a mechanical coupling mechanism for driving the apparatus associated with the copying operation, and further has a drawback of being complex in construction and expensive. Experience has shown that these devices are prone to malfunctions and are usually limited to approximately 20, as the largest, number of copies that can be set. Thus the use of this type of apparatus involves many problems.

The progress of electronic technology in recent years, has made available IC, LSI and like elements with an increased degree of component integration and a performance of enhanced stability at reduced costs. These electronic elements are widely used for controlling mechanical apparatus, such as copying machines. Such elements have also found use in electronic counters, which in combination with seven-segment number displays for indicating the count of the counter, combine to provide preset counter apparatus for copiers.

When electronic counters are used, the number of copies is usually set by ten keys to provide the numbers "0" to "9". In a case where the circuit or program for the counter is designed according to a comparison system, the set value is stored in a memory, and a signal which is emitted every copying cycle, is counted. When the count matches the stored value, the copying operation is discontinued. (U.S. Pat. No. 3,815,990, Newcomb et al., discloses a system of this type although the counter disclosed is not electronic. Alternatively when a subtraction system is resorted to, a decrement is subtracted from the preset value of the counter for every copying cycle, and the copying operation is discontinued when the count on the counter has been reduced to "0" such as disclosed in U.S. Pat. No. 4,105,914, Murata et al. In either case, the counter is associated with the copying operation only electrically, and the maximum number of copies to be made can be selected as desired, so that the electronic counter is free of many of the prior problems encountered with the foregoing mechanical counter apparatus. Accordingly counter apparatus incorporating such an electronic counter or programed control system are widely used in copying machines, etc.

However, with LSI's, microcomputers, etc. coming into wider use, copying machines and the like including electronic counters of the above type are also adaptable for more versatile functions in a copying operation especially when provided with a larger number of keys or displays for imputing and displaying various instructions or selection, by the user. There is also a tendency to provide these keys and displays concentrically on a single operation panel to render the machine easy and efficient to operate. This approach, however, leads to an increase in the area or size of the operation panel, with a greater likelihood of creating handling or manipulation errors and an increased production cost. These new problems are difficult to overcome, especially in the case of compact copying machines wherein only a limited amount of space is available on the operation panel and which must meet limitations with respect to production cost.

To solve the above problems, an apparatus has been proposed which has three input keys, namely an UP key, a DOWN key and a CLEAR key, as disclosed in the Published Japanese patent application No. Sho 54-145545 (1979). Every time the UP key or the DOWN key is depressed or when the key is held depressed position, the numerical value shown on a seven-segment number display is increased or decreased, while the CLEAR key, when depressed, returns the displayed value to "1". This proposed apparatus nevertheless is very cumbersome to use since when the number of copies to be set is large, the key must be depressed a large number of times or held in a depressed position for a prolonged period of time.

Thus the prior art is still seeking an optimimum counter apparatus for copying machines.

SUMMARY OF INVENTION

A main object of the present invention is to provide a preset counter apparatus in which numerical values are settable on an electronic counter without employing the same keys usually used for setting the numbers "0" to "9".

Another object of the invention is to provide a preset counter apparatus which is easy to use for setting numerical values efficiently, through a simple procedure and with the use of approximately two input keys.

Another object of the invention is to provide a preset counter apparatus comprising display means for displaying numerical values in terms of decimal numbers and input keys provided in corresponding relationship to each digit position of the display means whereby the value of the digit positions can be individually varied with a corresponding input key so that numerical values can be set efficiently and accurately.

Another object of the invention is to provide a preset counter apparatus having input keys, each of which is provided in corresponding relation to each digit position of the numerical value to be displayed, and which, when manipulated, vary the values in the digit positions from "0" to "9" independently of one another and without influencing one another. The counter apparatus further being adapted not to display "0" in the highest digit position but being capable of displaying "0" in another digit position only when a value other than "0" is entered in a higher digit position to reduce the likelihood of both operational and keying-in errors.

Another object of the present invention is to provide a preset counter apparatus which has input keys, each provided in corresponding relation to each digit position of numerical values, and in which, when one of the input keys is manipulated, "0" is thereby set in the digit position lower than the manipulated digit position so that the user can enter multiples of "10" conveniently.

Another object of the invention is to provide a preset counter apparatus having input keys, each provided in a corresponding relation to each digit position of numerical values, for varying the values in the digit positions individually and independently and also for transferring a carry from a digit position to the next higher digit position, whereby the apparatus is adapted to set numerical values rapidly.

Another object of the invention is to provide a preset counter apparatus which has input keys, each provided in a corresponding relation to each digit position of numerical values, and in which, when one of the input keys is manipulated, "0" is thereby set in the digit position lower than the manipulated digit position, the apparatus further being so adapted that when one of the input keys is manipulated for a digit position to produce a carry, the value in the next higher position is altered, the apparatus thus permitting the user to key-in multiples of "10" conveniently and to set numerical values rapidly.

Another object of the invention is to provide a preset counter apparatus in which when a plurality of input keys for digit positions of numerical values are depressed at the same time, the values concerned are prevented from varying despite the depression of the keys and are also held so prevented until the simultaneously depressed keys are all released so as to eliminate input errors.

Still another object of the invention is to provide a preset counter apparatus of the type described in which every time the input key for each digit position of the numerical value is depressed or every time a specified period of time has elapsed while the key is held depressed, the value in the digit position is increased by "1" to render the apparatus convenient to use.

More specifically, the present invention provides a preset counter apparatus for copying machines and the like comprising display means for displaying numerical values at least in the digit positions of units and tens, input key means for varying the values in the digit positions of the display means individually and independently, and control means for controlling the numerical values to be displayed on the display means in accordance with inputs of the input key means so as not to display "0" in the highest digit position of the display means and to display "0" in another digit position thereof only when a value other than "0" is displayed in a higher position.

The invention further provides a preset counter apparatus for copying machines and the like comprising display means for displaying numerical values at least in the digit positions of units and tens, input key means provided in corresponding relationship to the digit positions of the numerical values for varying the numerical values on the display means, and control means for preferentially accepting an input for a higher digit position in accordance with an input of the input key means, varying the value in the higher digit position stepwise and setting "0" in the next lower digit position.

The invention further provides a preset counter apparatus for copying machines and the like comprising display means for displaying numerical values at least in the digit positions of units and tens, input key means provided in corresponding relationship to the digit positions of the numerical values for varying the nemerical values on the display means, and control means for varying the values in the digit positions individually and independently in response to inputs of the input key means, transferring a carry when the carry is produced by setting a value in a lower digit position, the control means further being operable not to display "0" in the highest digit position of the display means and to display "0" in another digit position thereof only when a value other than "0" is displayed in a higher digit position.

The invention further provides a preset counter apparatus for copying machines and the like comprising display means for displaying numerical values at least in the digit positions of units and tens, input key means provided in corresponding relationship to the digit positions of the numerical values for varying the numerical values of the display means, and control means for preferentially accepting an input for a higher digit position in accordance with an input of the input key means, stepwisely varying the value in the digit position of the accepted input, setting "0" in the next lower digit position and transferring a carry to a digit position when the carry is produced by entering an input to the digit position immediately following the digit position.

The invention further provides a preset counter apparatus for copying machines and the like comprising display means for displaying numerical values at least in the digit positions of units and tens, a plurality of input key means provided in corresponding relationship to the digit positions of the numerical values for varying the numerical values on the display means, and control means for stepwisely varying the value in a digit position in accordance with an input entered by the input key means for the digit position, the control means further being adapted to control the numerical values on the display means so that when an input is given by one of the key means while an input is being entered by the desired one of the key means, the displayed numerical values are prevented from being varied by the key inputs and are so prevented until both the key means are released from the keying-in positions.

The objects and features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENTS

The following description is provided to enable any person skilled in the copier art to make and use the present invention and sets forth the best modes contemplated by the inventors of carrying out their invention. Various modifications, however, will remain readily apparent to those skilled in the art, since the generic principles of the present invention have been defined herein specifically to provide a compact copying machine with an improved counter apparatus.

Figure 1:
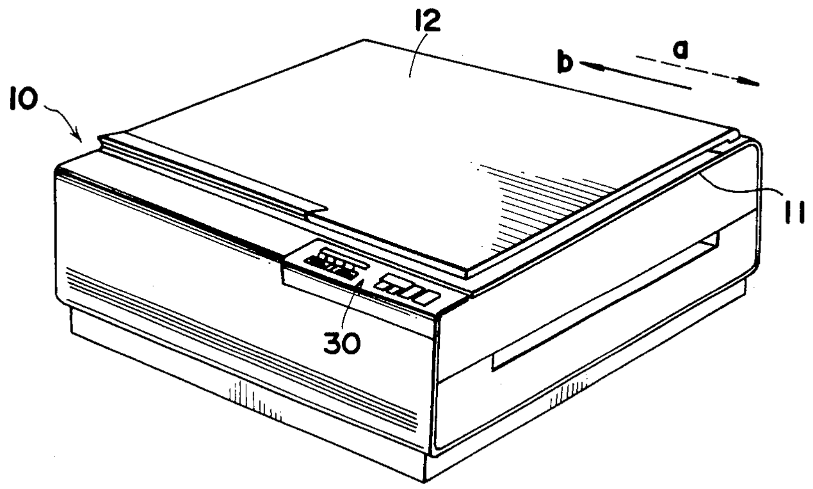
FIG. 1 is a perspective view showing the appearance of a copying machine equipped with a preset counter apparatus of the present invention.
Figure 2:
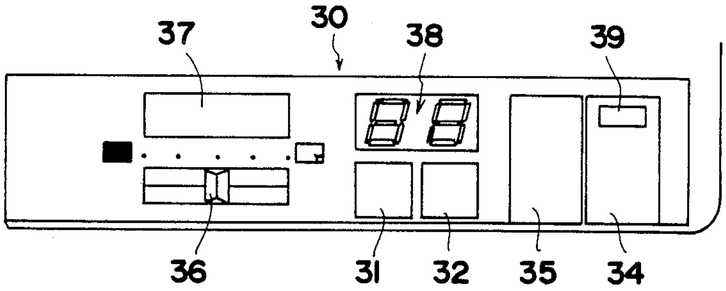
FIG. 2 is a schematic view showing an operation panel of the copying machine.

FIG. 1 is a perspective view showing the exterior appearance of a copying machine 10 including a preset counter apparatus of the present invention. FIG. 2 is a schematic view showing an operation panel 30 of the copier apparatus.

The copying machine 10 is provided on its top with an original document support glass plate 11 which is reciprocatingly movable in the directions of arrows a and b. The glass plate 11 moves with an original cover 12 to cause an optical system, to be described subsequently, to scan an unillustrated original document to project an image thereof on a photocondutive drum 13 shown in FIG. 3.

The operation panel 30 is provided at the upper end of an outer cover on the front side of the machine main body and has a key 31 for setting a numerical value in the digit position of tens, a key 32 for setting a numerical value in the digit position of units, a print key 34, a clear key 35, an image density adjusting knob 36, a display 37 for indicating paper jams or absence of paper or toner, a number display 38 for showing numerical settings, a power supply indicator 39, etc.

Figure 3:
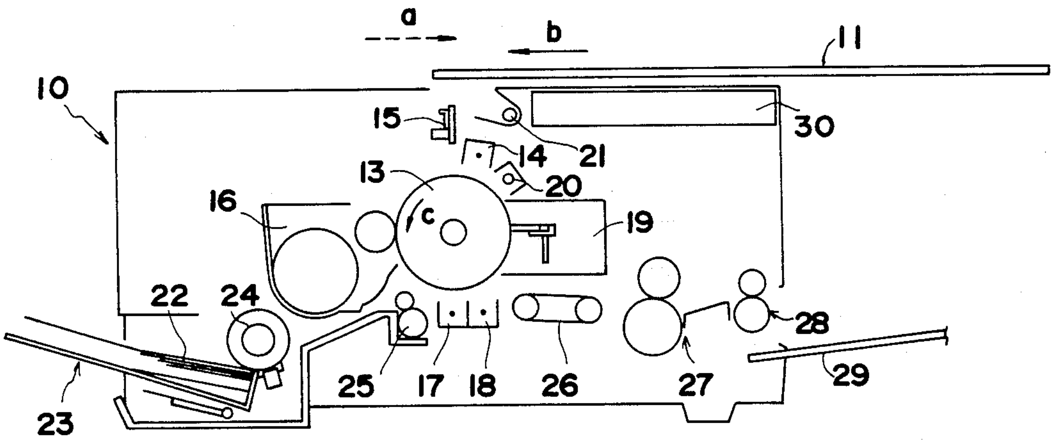
FIG. 3 is a schematic view in section showing the copying machine.

FIG. 3 is a cross sectional schematic view showing the construction of the copying machine 10. The construction and operation of the machine 10 will be described generally with reference to this drawing.

The photoconductive drum 13 is supported approximately in the center of the main body of the copying machine and is rotatable in the direction of arrow c. Arranged around the drum 13 are a sensitizing charger 14, an optical system 15 comprising an image transmitter formed by a bundle of optical fibers having graded refractive indexes, a developing unit 16, a transfer charger 17, an A.C. erasing charger 18, a cleaning unit 19, an eraser lamp 20, etc. If the glass plate 11 is not in its start position for scanning, as seen in FIG. 1, the plate 11 moves in the direction of arrow a to the start position shown in FIG. 3 when an exposure lamp 21 preliminarily goes on with the initiation of a copying operation. When the exposure lamp 21 is thereafter fully turned on, the glass plate 11 moves in the direction of arrow b for the scan of an original document, whereby the image of the original is continuously projected on the drum 13 during rotation to form a latent electrostatic image on the charged drum surface.

On the other hand, a sheet of copy paper 22 is removed from a copy paper accommodating or storage portion 23 having sheets of copy paper stacked therein, by a feed roller 24 which is rotablely driven in a timed relationship with the formation of the image on the drum 13 by the translation of the glass plate 11. The sheet 22 is fed to a transfer station as accurately timed by a timing roller 25 with the movement of the image on the drum 13. The latent image on the drum 13 is converted by the developing unit 16 to a toner image, over which the sheet 22 is placed. The toner image is transferred onto the sheet 22 by the transfer charger 17. The sheet 22 is then passed over an A.C. erasing charger 18 and fed by a conveyor belt 26 to a fixing unit 27. The sheet 22 with the toner image fixed thereto is delivered onto a tray 29 by discharge rollers 28. After the transfer, the residual toner is removed from the drum 13 by the cleaning unit 19, while the residual charges are erased by the eraser lamp 20. The drum 13 is now ready for the next copying cycle.

Prior to the above copying operation by the machine 10 having the foregoing construction, the number of copies to be made would have been preset by manipulating the keys 31, 32 provided therefor on the operation panel 30 shown in FIG. 2. In accordance with the numerical value shown on the display 38, the copying cycle described is repeated continually.

Figure 4:
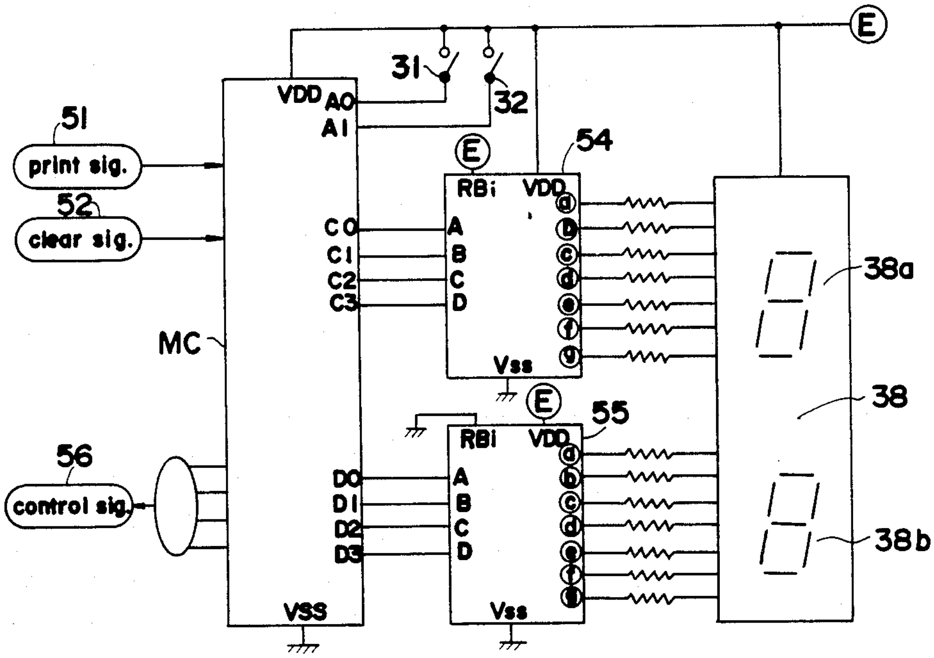
FIG. 4 is a circuit diagram showing the relationship between a display and a microcomputer for controlling the copying machine and the preset counter according to the invention.
Figure 5A:
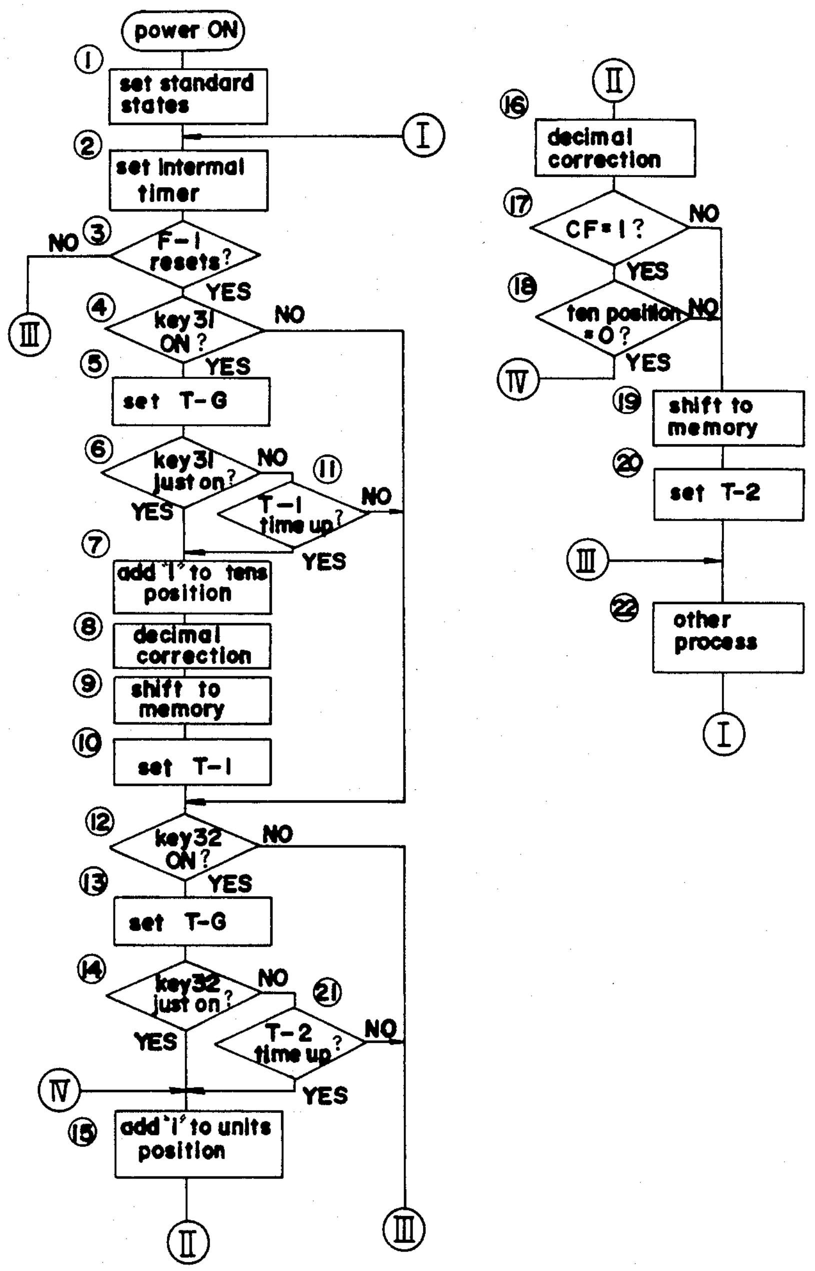
FIG. 5 (*a*), FIG. 5 (*b*), FIG. 5 (*c*), FIG. 5 (*d*) and FIG. 5 (*e*) are flow charts for illustrating embodiments of the invention.
Figure 5B:
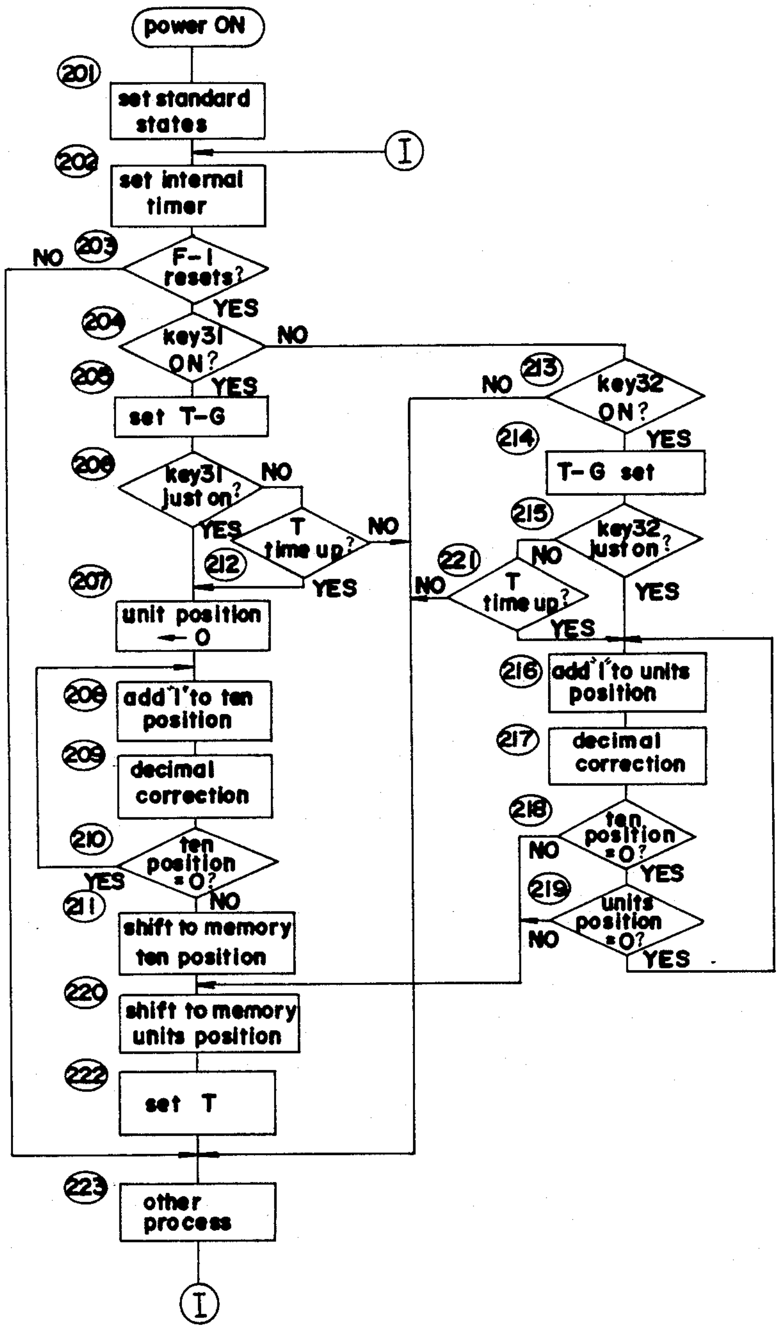
Figure 5C:
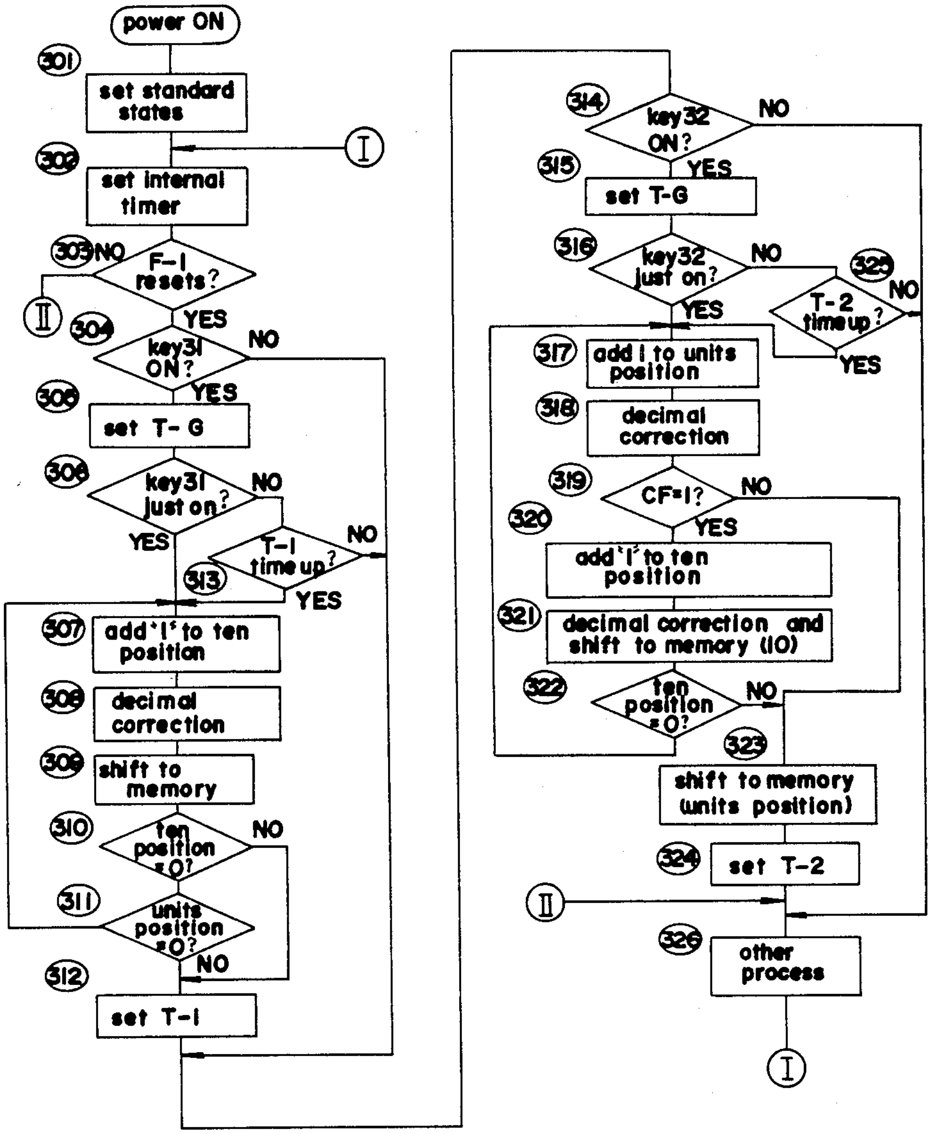
Figure 5D:
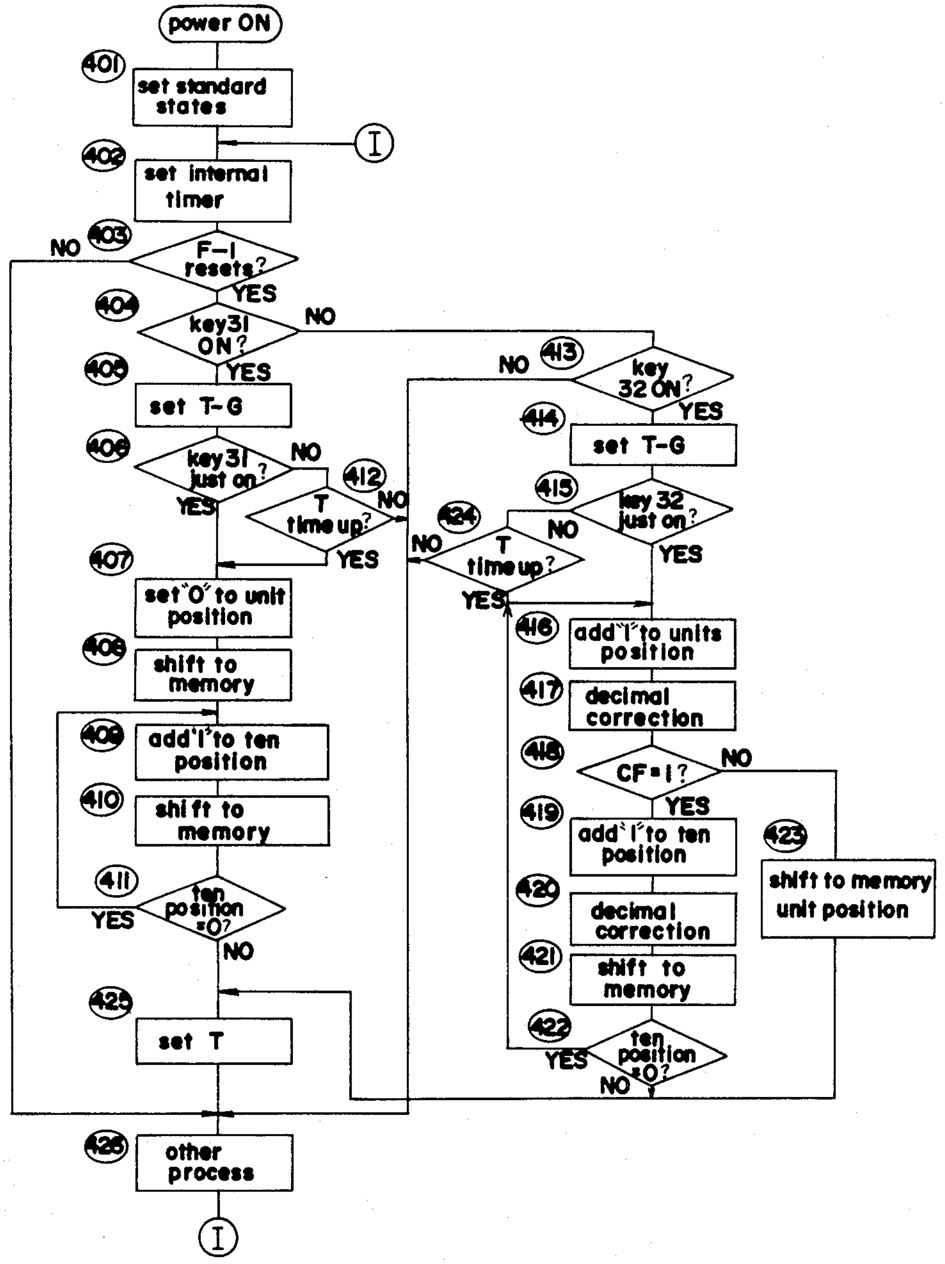
Figure 5E:
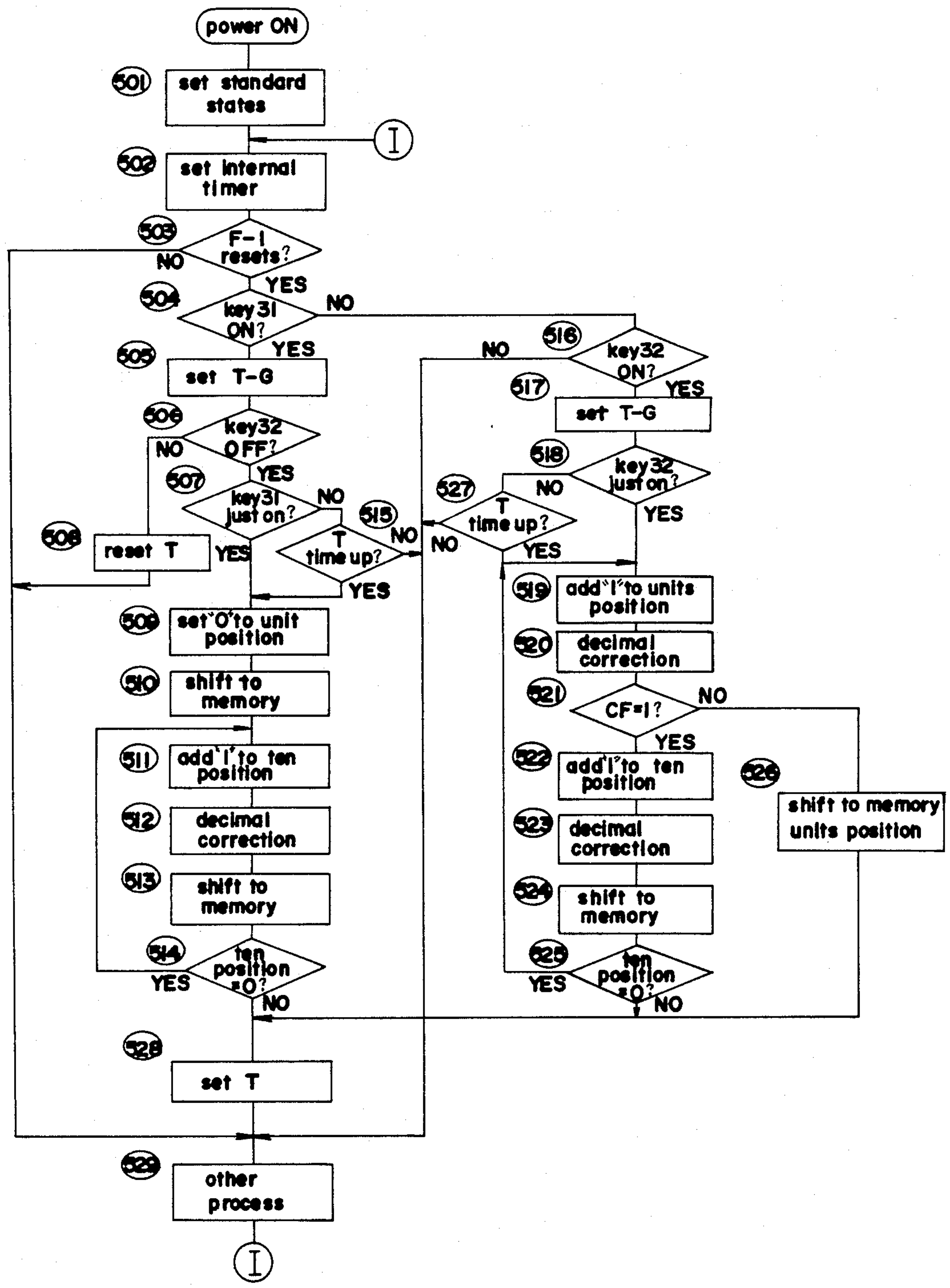
Figure 6A:
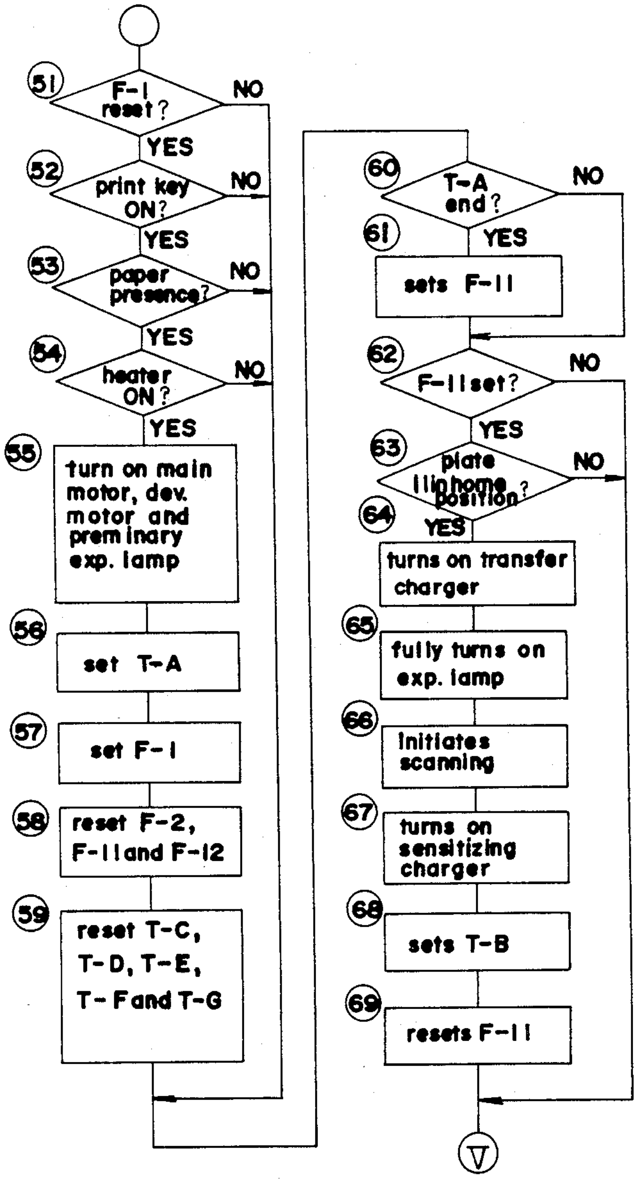
FIG. 6 (*a*), FIG. 6 (*b*), FIG. 6 (*c*) and FIG. 6 (*d*) are a series of flow charts for illustrating processing procedures for controlling the copying operation.
Figure 6B:
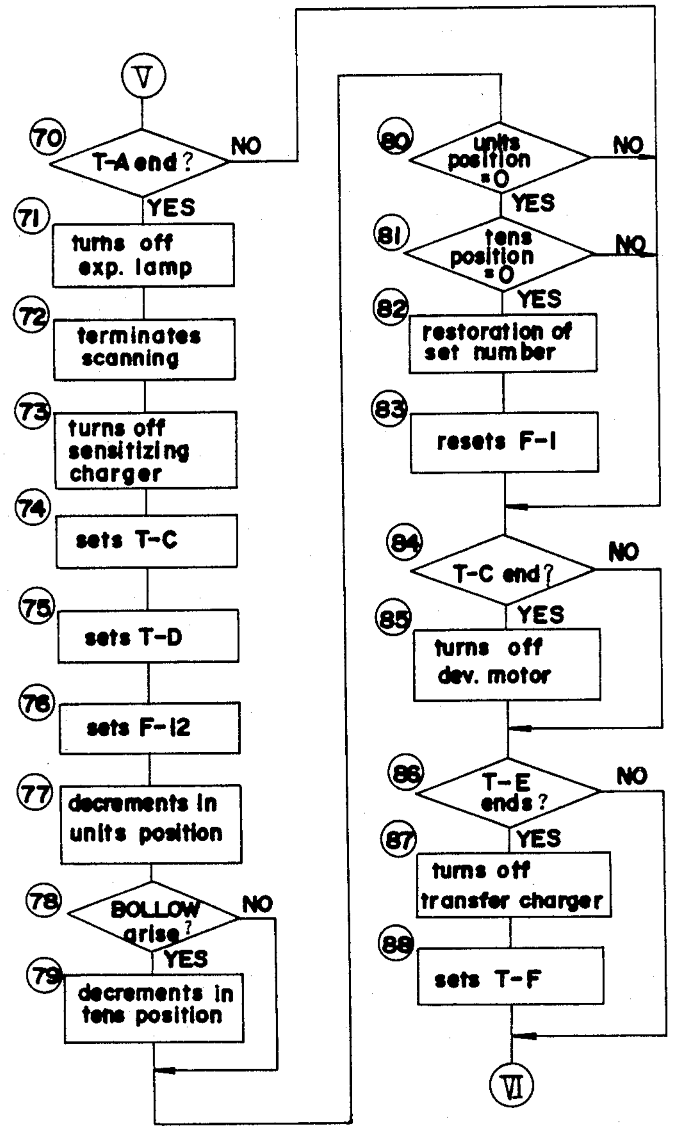
Figure 6C:
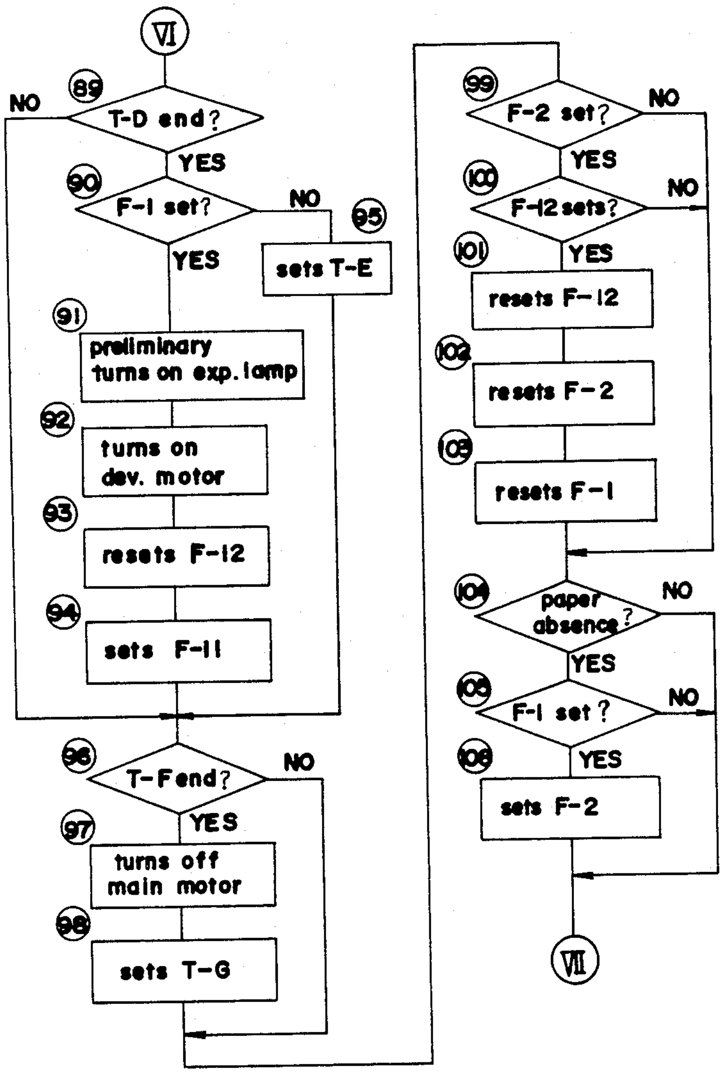
Figure 6D:
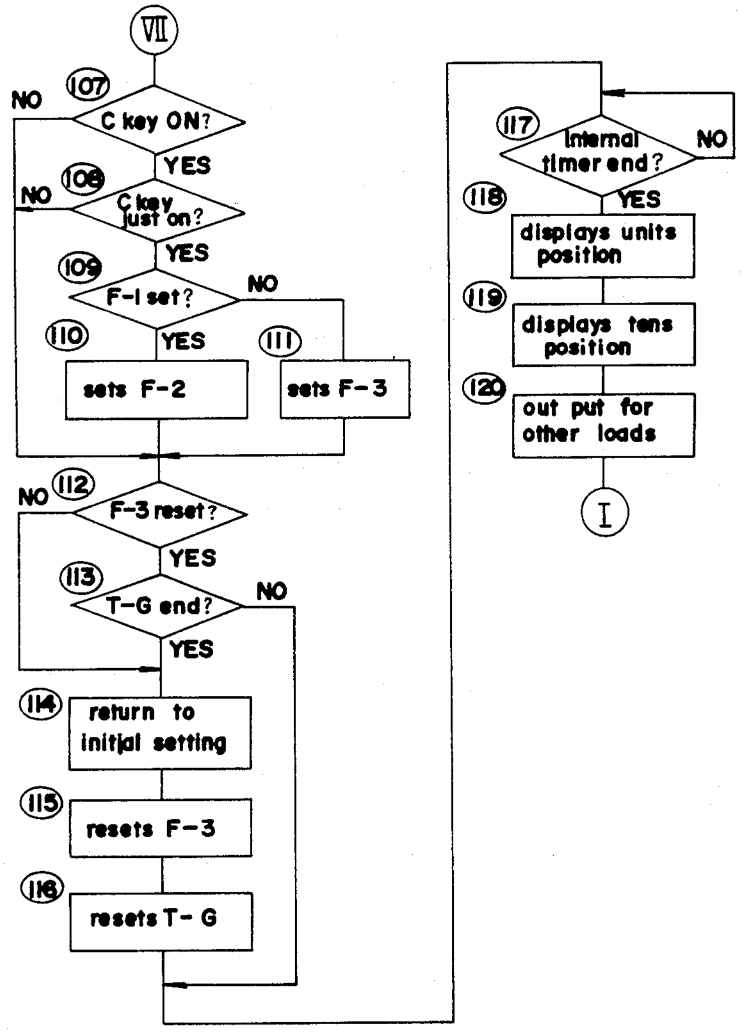

The operation of the copying machine, including the presetting of the copy number and repetition of the copying cycle is controlled, for example, by a microcomputer MC as shown in FIG. 4. The control procedures for presetting the copy number and repeating the copy cycle will now be described with reference to FIG. 5 (*a*) to FIG. 5 (*e*) and FIG. 6 (*a*) to FIG. 6 (*d*).

The microcomputer MC can generally include the known elements of a central processing unit (CPU), a read-only memory (ROM), a random access memory (RAM), an accumulator (ACC), etc. The microcomputer MC receives input signals from the copy number setting input keys 31, 32 and, signals from the print key 34 and the clear key 35 and feeds control signals to BCD seven-segment decoders 54, 55 for controlling the numerical setting on the display 38 according to a predetermined program. The microcomputer MC also provides signals 56 for controlling the operation of the copying machine to execute a copying operation in accordance with the numerical setting. Both the decoders 54, 55, which control the number, to be represented by an arrangement of light emitting elements of seven-segment number display devices 38*a*, 38*b*, are adapted to display the digits "0" to "9" with combinations of high level "H" and low level "L" of the outputs from their output terminals (a) to (g). These outputs are controlled by the microcomputer MC. According to the contemplated use, seven-segment number display devices are used in a suitable combination. Other number display means are also usable. The binary data from output terminals C0 to C3 of the microcomputer MC is converted by the decoder 54, which delivers an output for controlling the number in the tens digit position to be shown on the display portion 38*a*. The binary data from output terminals D0 to D3 is converted by the decoder 55, which gives an output for controlling the number in the units digit position to be shown on the display portion 38*b*. Since the construction of the decoders 54, 55, are already known in the prior art , these devices will not be further described.

FIG. 5 (*a*) is a flow chart showing a first embodiment of this invention. The chart illustrates the procedures or processes performed within the microcomputer MC for setting the number of copies with the keys 31, 32. For convenience of description, the following embodiments will be described with reference to a case in which a numerical value of two digits is set since the microcomputer operates similarly for settings of three or more digits.

When the power supply is turned on for the copying machine 10 as seen in FIG. 5 (*a*), the not illustrated heater of the fixing unit 27 is energized to start heating.

With power also supplied to the power source E of the control circuit including the microcomputer MC, the microcomputer MC is also initiated into operation.

In step 1, the standard state of operation mode of the copying machine 10 is read from the internal store of the microcomputer MC, and the machine is set for operation. The term "standard state" refers to the standard operating conditions predetermined for the copying machine, for example, for making a single copy. Such conditions are shown on displays, or when desired, a movable member is returned to a specified position. When the copying machine is adapted to return to standard conditions in respect to copying magnification, paper size, heater temperature and image density which are selectively variable, the machine will be automatically set to the standard state with respect to these conditions.

In step 2, an internal timer is set to the processing time for the microcomputer MC, i.e. the time for a routine of the program. In step 3, a flag F-1 indicating continuation of copying operation is checked. If it is reset, step 4 follows:

The key 31 for setting a number in the digit position of tens is checked in step 4. When the result in "NO", step 12 follows for checking the key 32 for the units position. If the result is "YES", a timer T-G is set in step 5. The timer T-G functions to return the set conditions including the copy number to the standard state when no action is taken within a specified period of time after it has been set as specified. For example, it can be set for a period of about 30 seconds to about 1 minute, and is automatically reset when the print key is depressed or if the copy number setting key is manipulated in the meantime. The timers to be set or reset in the process of the flow chart and including the timer T-G are digital timers provided, for example, in a specified area of the RAM in the microcomputer MC and are so programmed as to count up "1" for one routine. The time is set by presetting the numerical data to be so counted.

Step 6 checks the key 31 for its depression such as whether the key 31 is depressed in the current routine or in the previous routine. If the key 31 is depressed in the current routine, step 7 is performed in which "1" is added to the stored value in the tens position, followed by step 8 for decimal correction and step 9 to shift the result of addition to the memory for temporary storage. In step 10, a timer T-1 is set. When the key 31 is held depressed, the timer T-1 increases the numerical value by an increment of "1" upon lapse of the set time, for example, of about 500 msec. Thus when the key 31 is held depressed, the sequence of steps 4, 5, 6, 11, 7, 8, 9 and 10 is repeated every time the set time on the time T-1 has elapsed, to add the increment of "1" every elapsed time. In this case, the time T-G is reset every routine.

Independently of the setting of a numerical value in the digit position of tens, i.e. manipulation of the key 31, steps 12 to 21 check manipulation of the key 32 and set a numerical value in the digit position of units. Step 12 checks whether or not the key 32 is on. If it is on, the timer T-G is set in step 14 as in step 5. Step 14 detects when the key 32 is depressed. If the result is "YES", step 15 adds an increment to the value in the units position, followed by step 16 for decimal correction. Step 17 checks whether or not a carry flag CF, which is used for detecting a carry in usual counters, consequently becomes 1. If it is 1, i.e. if the count of the counter is the decimal number "10", step 18 follows to check whether or not the value in the tens position is "0". When it is not "0", the set value in the units position is shifted to the memory in step 19. A timer T-2, having the same function as the timer T-1 in step 10, is set in step 20. If the carry flag CF is found not to be "1" in step 17, step 19 directly follows. If step 18 reveals that the value in the tens position is "0", step 15 is repeated to add an increment to the units position. Steps 16, 17, 19 and 20 are thereafter performed, followed by step 22 for "other process".

If the result of step 14 for checking when the key 32 is depressed, proves "NO", step 21 is performed to check the timer T-2 for the lapse of the set time. Upon lapse of the time, an increment is added to the units position. The same process as mentioned above is thereafter performed.

More specifically the copy number is set in the following manner according to the foregoing procedures.

When the power supply is turned on, the value "0" is set in the tens position and the value "1" in the units position by the initialization of step 1. The display 38 shows the value "1" in the units position only on the display portion **38*b*, but the display portion 38*a* for the tens position remains blank without showing "0" for the following reason. With reference to FIG. 4, RBI terminal of the decoder 54 for controliing the number in the tens position is set to "H", while RBI terminal of the decoder 55 for controlling the number in the units position is set to "L". The decoders 54, 55** are further so adapted that when the input terminals A to D of each decoder are all "L" (corresponding to the value "0"), the outputs (a) to (g) are all "1" (blank) if the RBI terminal is "H", or "0" is displayed (for example, (g) only is "L" and the others "H") if the RBI terminal is "L". Accordingly the value "0" is not displayed.

Subsequently when either one of the keys 31, 32 is depressed, the resulting count with "1" increment (i.e. "1" in tens position or "2" in the units position) is shown on the display portion **38*a* or 38*b* corresponding to the depressed key in steps 6, 7 or steps 14, 15. If the key is continuously held depressed, the counted-up data is displayed and also shifted to the memory every time the time set on the timer T-1 or T-2 has elapsed, in steps 6, 11, 7 or steps 14, 21, 15. For counting up, the key may be held depressed in this way, or the key 31, 32** may be turned on and off a required number of times.

When the key 31 or 32 is depressed after the set number has become "9" through counting up, a hexadecimal number $A_H$ (1010) corresponding to the decimal number "10" is counted by a counter (such as is programmed in a specified area of the RAM to count up "1" in response to each increment signal) in the microcomputer MC, while step 8 or step 16 is performed for decimal correction (+6 calculation) to give a carry "1". The counter data changes to "0". Without adding the carry to the next higher digit position, the counter data changes from "9" to "0".

When the count of the counter for the units position or the counter for the tens position becomes "0", steps 17 and 18 follow. Step 17 checks the carry flag (CF) for the units counter. When CF=1 (units counter - 0), step 15 is repeated to set "1" in the units position and then step 20 is performed if the count of the tens counter is also "0", or "0" is stored as the value in the units position only if the count of the tens counter is not "0". Conversely when Cf=0 (units counter≠0), the value in the units position is stored irrespective of the value in the tens position.

Thus, with the preset counter according to the first embodiment of the invention, the values in the tens position and in the units position are set independently of each other by depressing the keys 31 and 32 respectively. "0" in the tens position is not displayed, while "0" in the units position can be displayed only when a value other than "0" is set in the tens position. When the value in the units position become "0" with "0" in the tens position, an increment is added to the units position, so that "1" is automatically stored and displayed without taking any action.

Accordingly, as compared with the counter in which numerical values are set merely by manipulating UP and DOWN keys, numerical values of two or more digits, especially, can be keyed in within a shorter period of time. Further since the operation of the present counter does not involve a carrying operation, the counter is free of any trouble that a large value will be entered erroneously.

FIG. 5 (*b*) is a flow chart showing a second embodiment of the invention. Steps 201 to steps 203 are the same as steps 1 to 3 of the first embodiment.

Step 204 checks the key 31 for setting a value in the tens position. When the result is "NO", step 213 follows for checking the units key 32. If the result is "YES", the timer T-G is set in step 205.

Step 206 checks the key 31 as to when it is depressed. When the key 31 is depressed in the routine concerned, the following steps are executed: step 207 of setting "0" in the units position, step 208 of adding an increment "1" to the tens position, step 209 of decimal correction, step 210 of ascertaining that the value in the tens position is not "0", and step 211 of shifting the value in the tens position to the memory. If the result of checking of the key 31 in step 206 is "NO", i.e. if the key 31 is continuously held depressed, the lapse of time set on a timer T for counting up the setting stepwise in increments of "1" by the continuous depression is checked to add an increment every time the set time has elapsed.

If the result of checking the key 31 in step 204 is "NO", step 213 follows to check the key 32 for depression. If the key is on, the timer T-G is set in step 214 as in the foregoing step 205. Step 215 checks when the key 32 is depressed. When the result is "YES", an increment is added to the units position in step 216. If the result is "NO", steps 221 and 216 are performed in which an increment is added to the units position every time the time set on the timer T has elapsed. When the value of the counter becomes "0" with the increase of the value in the units position, steps 218 and 219 follow as illustrated. If the value in the tens position is not "0", the value in the units position, steps 218 and 219 follow as illustrated. If the value in the tens position is not "0", the value in the units position is shifted to the memory in step 220, so that the value "0" is stored, whereas if the value in the tens position is also "0", step 219 is followed by step 216 in which an increment is added to the units position. Step 220 thereafter follows.

More specifically the number of copies is set in the following manner according to the above procedures. When the power supply is turned on, the value "0" is set in the tens position and the value "1" in the units position by the initialization of step 201. As is the case with the first embodiment, the display 38 shows the value "1" in the units position only on the display portion 38*b*, but the display portion 38*a* for the tens position remains blank for the same reason as already described, When a value of a single digit other than "1" is to be set, the key 32 only is used. The value is set by turning on and off the key 32 a required number of times, or by holding the key depressed. When a value of two digits is to be set, the number in the tens position is set first with the tens key 31 in the same manner as in the first embodiment except that the value "0" is set in the units position at this time in the case of the second embodiment. Accordingly if the number of copies to be set is 10 multiplied by an integer, there is no need to depress the units key 32. If otherwise, the tens key 31 is depressed, and the units key 32 is thereafter depressed to set the value in the units position only independently. When the value changes from "9" to "0" in setting the units value, the carry is not added to thereby leaving the tens value unaffected. This eliminates any trouble that a value could be otherwise added to the tens position by missetting the value in the units position, and the desired value must be set again.

FIG. 5 (*c*) shows a third embodiment of the invention, in which the values in the digit positions are varied individually independently by manipulating the keys 31, 32 as in the first embodiment of FIG. 5 (*a*). Accordingly, the processing procedures shown in the flow chart are substantially similar to those of FIG. 5 (*a*). However, as shown in step 319 to step 323, the third embodiment differs from the first in that when a carry arises from "9" to "0" (i.e. when the carry flag CF becomes "1") in setting a value in the units setting a value in the units position, an increment is added to the value in the tens position.

Stated more specifically, when the key 32 is depressed after the number set in the units position has become "9" by counting up, a hexadecimal number $A_H$ (1010) corresponding to the decimal number "10" is counted by the counter in the microcomputer MC. Step 318 is performed for decimal correction (+6 calculation) to give a carry "1". The count of the counter for the units position changes from "9" to "0", while the carry is transferred to the tens position.

Thus with the preset counter according to the third embodiment of the invention, the values in the tens and units positions are set independently of each other with the keys 31, 32, and when the key 32 is depressed with the value "9" in the units position, a carry is added to the tens position. For example, when the value "23" is to be set on the counter apparatus in the initially set state, the tens key 31 is turned on and off twice and the units key 32 twice, or each of the keys is held depressed for counting up twice. The numerical values of up to "99" are settable also by depressing the units key 32 only.

This system has the following advantage. With a counter setting system wherein an UP key and a DOWN key are used as already described as a prior art apparatus, it is cumbersome to set a large number when starting with "0" or "1" whereas according to the present invention in which tens and units are settable independently, large numbers can be set rapidly and conveniently. However, it is still cumbersome to change a value, for example, of "29" set on the counter to "30" or "31" merely by varying the values in the digit position independently, i.e. by depressing both the tens key 31 and the units key 32. The third embodiment in which a carry can be added by counting up units therefore has the advantage that the numerical value is settable easily only with the units key 32.

FIG. 5 (*d*) shows a fourth embodiment of the invention in which the input key for the higher digit position, when manipulated, also sets the value "0" in the lower digit position as is the case with the second embodiment shown in FIG. 5 (*b*). Accordingly the processing procedures shown in the flow chart are substantially the same as those shown in FIG. 5 (*b*). As shown in step 416 to step 423, nevertheless, the fourth embodiment differs from the second in that when units are counted up to result in a carry, the carry is added to the tens position as is the case with the embodiment of FIG. 5 (*c*).

For example, if a displayed setting of "29" is to be changed to a different value, such as "31" or "32", the tens key 31 and then the units key 32 must be depressed according to the system shown in FIG. 5 (*b*), which can be cumbersome. With the present embodiment, however, such a value is easily settable only with the units key 32 since a carry can be transferred by manipulating the units key 32.

FIG. 5 (*e*) shows another embodiment in which the values in the digit positions are prevented from varying if the input keys 31, 32 are both depressed, for example, when the user touches one of the keys while depressing the other key, in order to avoid input errors. Although this mode of control is applicable to and useful for any of the foregoing embodiments shown in FIG. 5 (*a*) to FIG. 5 (*d*), FIG. 5 (*e*) shows the control mode as applied to the embodiment of FIG. 5 (*d*).

With reference to FIG. 5 (*e*), step 501 to step 503 are the same as the corresponding steps of any of the foregoing embodiments. Step 504 checks the key 31 for setting a value in the tens position. When the result is "NO", step 516 follows for checking the units key 32, or if the result is "YES", the timer T-G is set in step 505. Step 506 checks the units key 32 for its depression. If the key 32 is off, step 507 follows. If the key 32 is on, the timer T is reset in step 508.

Step 507 and steps 509 et seq. are similar to step 406 and steps 407 et seq. in FIG. 5 (*d*).

Thus when the keys 31, 32 are both on in the embodiment of FIG. 5 (*e*), the timer T is reset in step 508, followed by step 529, and values are counted up neither in the units position nor in the tens position.

Further if one of the keys 31, 32 is thereafter released from the depressed positions, the timer T has already been reset in step 508, so that the result of step 515 or 527 leads to step 529 without counting up.

Consequently while one of the keys 31 and 32 is being manipulated for setting a numerical value, the setting can be temporarily interrupted by manipulating the other key. A new value is not settable thereafter until the manipulation of both the keys 31, 32 is completed in order to avoid the possible change of the displayed value due to the delayed release of one of the keys, because when the operator is to complete the manipulation of the keys 31, 32 after the displayed value has been prevented from being varied by the inputs of the two keys, the operator is unable to release the two keys at the same time, with the result that one of the keys will be released several msec to tens of msec later than the other key to vary the value by the input of the delayed key. Further since the variation of the value is prevented if the two keys are turned on at the same time, an input error is avoidable to leave the value unchanged even when the two keys are arranged close to each other and therefore erroneously depressed.

FIGS. 5 (*a*) to (*d*) are flow charts showing an example of "other process" of steps 22, 223, 326, 426 and 529 in FIGS. 5 (*a*) to (*e*). For illustrative purposes, display of numerical values set according to the flow charts of FIGS. 5 (*a*) to (*e*), automatic clearing mechanism following the lapse of time set on the timer T-G, sequential control of the copying machine following the depression of the print key, etc. are shown. The processing procedures of FIGS. 6 (*a*) to (*d*) will be described below with reference to the time chart of FIG. 7.

In step 51 of FIG. 6 (*a*), the flag F-1 is checked for resetting. When the result is "YES", step 52 checks the print key 34 for depression. If the key is on, the presence or absence of copy paper 22 and the temperature of the fixing unit 27 are checked in steps 53 and 54 respectively. When the copy paper 22 is not set in position or when the temperature is lower than is specified, the input of the print key is not accepted. Examples of means for detecting the paper and the temperature are already well known and are therefore not illustrated or described.

When the print key 34 is turned on with the copy paper, fixing unit, etc. in condition for operation, steps 55 to 59 are performed to energize the main motor (not shown) and developing motor (not shown), to preliminarily turn on the exposure lamp 21, to set a timer T-A for starting a scanning movement, to set the flag F-1 for indicating the continuation of a copying operation, to reset a flag F-2 indicating instructions for stopping copying operation and flags F-11, F-12, and to reset timers T-C, -D, -E, -F as well as the timer T-G for automatically clearing the foregoing set conditions.

Figure 7:
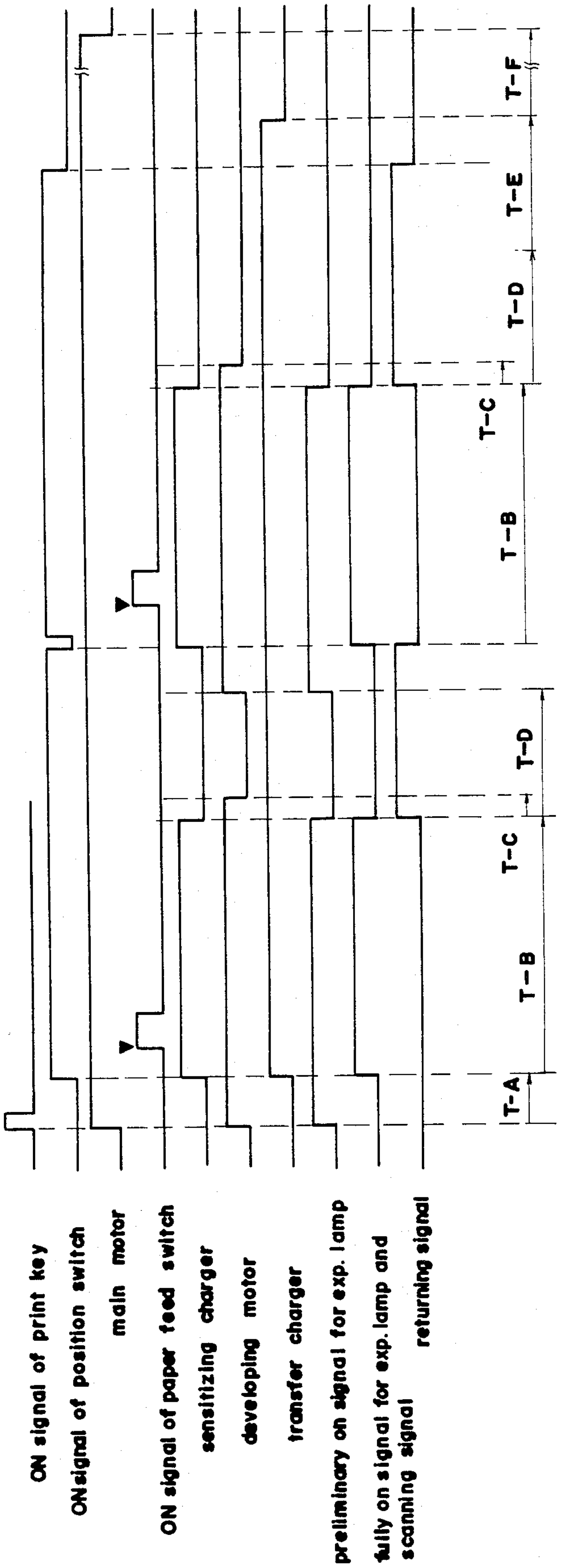
FIG. 7 is a time chart for controlling the copying operation.

Although it has been described with reference to FIG. 3 that the original support glass plate 11, when not in its start position for scanning, first moves in the direction of arrow a to the start position upon depression of the print key and thereafter moves in the direction of arrow b for the scan of the original, the first or preliminary movement of the glass plate 11 will not be mentioned in the description of the flow charts of FIG. 6 with reference to FIG. 7. Accordingly in the following description, the term "specified position" of the glass plate 11 means the scanning start position where the plate is stopped.

In step 60, the lapse of time set on the timer T-A is detected, whereupon the flag F-11 for setting scan starting conditions is set in step 61. Step 62 confirms the setting of the flag F-11, and step 63 subsequently checks whether or not the glass plate 11 is in its specified position. When the result is "YES", steps 64 to 69 are performed to energize the sensitizing and transfer chargers, to fully turn on the exposure lamp properly, to engage a clutch (not shown) for effecting a scanning movement, to set a timer T-B for setting the length of the scan and to reset the flag F-11.

Until the lapse of the time set on the timer T-B is detected in step 70 of FIG. 6 (*b*), an image is formed on the photoconductive drum 13, while with the start of the movement of the glass plate 11, suitable switching means is actuated to start feeding a sheet of copy paper.

When the lapse of the set time on the timer T-B is detected, steps 71 to 77 are executed to turn off the exposure lamp, to disengage the scan clutch, to de-energize the sensitizing charger, to set the flag F-12, to set the time of timer T-C for setting when to stop the developing motor, to set the timer T-D for determining when to start the next copying cycle for continuous copying, and to subtract a decrement from the value in the units position of the copy number setting counter described. If a borrow arises in the subtraction, the decrement "1"

is borrowed from the tens position in step 79. If the value in the tens position is also "0" at this time, this is detected in steps 80 and 81. In step 82, the number of copies initially set is read out from the memory and set as the numerical value to be displayed for "restoration of set number". The flag F-1 is reset in step 83, indicating that there is no operation to be continued for image formation. When the results of steps 80 and 81 are "NO", step 84 follows with the flag F-1 in a set state to detect the lapse of time set on the timer T-C, whereupon the developing motor is de-energized in step 85.

In step 86, the termination of a timing period of the timer T-E to be described later is detected, whereupon the transfer charger is turned off in step 87 and the timer T-F for auto-shut is set in step 88. Thus these steps 87 and 88 are executed on completion of the final copying cycle.

The timer T-D is checked for the lapse of time set thereon in step 89 of FIG. 6 (*c*). If the result is "YES", step 90 checks whether or not the flag F-1 is set, i.e. whether or not the subsequent copying operation is requested. When the flag F-1 is set, steps 91 to 94 are performed for initiating subsequent copying operation by preliminarily turning on the exposure lamp, energizing the developing motor, setting the flag F-11 and resetting the flag F-12 for setting the condition for accepting a stop signal.

If the flag F-1 is found to be reset in step 90, the timer T-E for turning off the transfer charger is set in step 95. Step 96 follows to detect the lapse of time set on the abovementioned auto-shut timer T-F, whereupon the main motor is turned off to stop the operation of the copying machine, and the timer T-G is set to clear the set conditions (steps 113 and 114) if no action is subsequently taken within a predetermined period of time.

Step 99 checks the flag F-2 for indicating conditions for discontinuing the copying operation being conducted. The flag F-2 is set, for example, in the event of the absence of paper during a copying operation as shown in steps 104 to 106, or when the clear key 35 is depressed as shown in steps 107 to 110. If the flag F-2 is set, step 100 checks the flag F-12 as to whether or not a stop signal is acceptable. If the result is "YES", the flags F-12, F-2 and F-1 are reset to prevent the next copying operation. The condition in which the stop signal is acceptable as mentioned above refers to a state in which the flag F-1 is set during the period following the lapse of time set on the timer T-B until the time set on the timer T-D has elapsed.

With reference to FIG. 6 (*d*), step 107 checks the clear key 35 for its depression. If it is depressed, step 109 checks the flag F-1. When the flag F-1 is set, the flag F-2 is set, whereas if the flag F-1 is in a reset state, a flag F-3 is set.

Since the setting of the flag F-2 is detected in step 99 and the flag F-1 is reset in step 103, the next copying operation is prevented. After the flag F-3 has been set, steps 112 and 114 follow to return the set number to the initial setting, namely "1".

Step 117 for detecting the lapse of time set on the internal timer in steps 2, 202, 302, 402 and 502 continues until the termination of the set period, whereupon the contents of the units counter and the contents of the tens counter are read out in steps 118 and 119 respectively, and the data is delivered from the output ports C0–C3 and D0–D3 of the microcomputer MC and displayed on the display 38. Step 120 processes output for other loads in the interior of the copying machine. Although the detection of the lapse of time set on the timer T-B is utilized in the above embodiment for subtracting a decrement from the set value for every copying cycle, also useful for this purpose are, for example, the paper feed start signal shown in FIG. 7, and the signal of a microswitch or the like, if such signal is used for returning the original support glass plate.

While the value "1" is displayed when the power supply is turned on according to the foregoing embodiments, the display may be adapted to show "1", for example, in response to a signal emitted when the heater of the fixing unit has been fully warmed up.

The preset counter apparatus of this invention is also usable for machines other than copying machines for presetting the number of repetitions of a specified operation.

According to the embodiments described above, the completion of repeated copying cycles is detected by subtracting the decrement of "1" from the set copy number during every copying cycle and resetting the flag F-1 when the values in all the digit positions have been reduced to "0", indicating that no further copying operation is requested. This can be achieved alternatively with the use of a memory for storing the set copy number, a counter for counting up "1" every copying cycle and comparison means for comparing the count with the set value in the memory, such that a further copying cycle is prevented when the two values are found to match. However, the system used for the foregoing embodiments has the advantage that the copying operation can be discontinued only by detecting "0" without the need to separately provide the counter for counting the number of copying cycles, comparison means, etc.

While the above embodiments have been disclosed as the best modes presently contemplated by the inventors, it should be realized that these examples should not be interpreted as limiting, because artisans skilled in this field, once given the present teachings, can vary from these specific embodiments. Accordingly, the scope of the present invention should be determined solely from the following claims in which we claim.

What is claimed is:

1. A preset counter apparatus for copying machines and the like comprising:

display means for displaying numerical values at least in the digit positions of units and tens;

a first input key provided in a corresponding relation to the digit position of units for generating a signal when operated;

a second input key provided in a corresponding relation to the digit position of tens for generating a signal when operated;

display control means, responsive to said signals generated by the first and second keys, for varying the numerical values of each digit position of units and tens stepwise respectively; and control means for setting "0" in the digit position of units when generating said signal of said second input key regardless of said value displayed in said digit position of units.

2. The invention of claim 1 further including a timer means for automatically incrementing a digit position after a predetermined time period during a continual activation of an first input key.

3. The invention of claim 1 further including a reset key means for setting the numerical values of units to one and numerical values of tens to zero when depressed.

4. The invention of claim 1 further including a setting means for automatically setting the numerical values of units to one and numerical values of tens to zero when electric power is supplied to the machine.

* * * * *